Patented May 22, 1923.

1,456,151

UNITED STATES PATENT OFFICE.

WILLIAM ALBERT RUDDELL, OF ASBURY PARK, NEW JERSEY.

METAL POLISH.

No Drawing. Application filed December 28, 1921. Serial No. 525,447.

*To all whom it may concern:*

Be it known that I, WILLIAM A. RUDDELL, a citizen of the United States, residing at Asbury Park, in the county of Monmouth and State of New Jersey, have invented certain new and useful Improvements in Metal Polishes, of which the following is a specification.

This invention relates to metal polishing compositions and has as its object to provide a composition especially useful in polishing the metal parts of typewriters, cash registers, gun barrels, various kinds of tin, copper and aluminum ware, brass, nickel, and other metals.

Another object of the invention is to provide a composition which will be useful in cleaning and polishing glass articles.

Another object is to provide a polish which will remove all tarnish or rust from the metal surfaces to which it is applied.

Another object of the invention is to provide a composition which will not freeze in the colder months.

The composition embodying the invention consists of a mixture of:

Tripoli powder, $4\frac{1}{2}$ lbs.
Oxalic acid (crystals), $\frac{1}{2}$ lb.
Salt, 1 to 3 tablespoonfuls.
Borax, 1 to 3 oz.
Distilled water, 1 gal.
Alcohol from 10 to 50 per cent.

In preparing the composition the tripoli powder, oxalic acid, salt, and borax are thoroughly stirred and to the mixture is added somewhat less than a gallon of water to which in turn has been added a sufficient amount of wood, denatured, or grain alcohol to prevent freezing. The whole is then stirred for several minutes to thoroughly mix the ingredients and afterwards the mixture is stirred once every one or several hours and is then allowed to stand from ten to twenty-four hours, after which it is ready for use.

Having thus described the invention, what is claimed as new is:

1. A metal polishing composition comprising a mixture of tripoli powder, oxalic acid, salt, borax, water, and alcohol.

2. A polishing composition comprising a mixture of tripoli powder, salt, borax, and oxalic acid.

3. A polishing composition comprising a mixture of tripoli powder, salt, borax, oxalic acid and water in about the proportions of tripoli powder $4\frac{1}{2}$ lbs., salt 1 to 3 tablespoonfuls, borax 1 to 3 ounces, oxalic acid $\frac{1}{2}$ pound, and water 1 gal.

In testimony whereof I affix my signature.

WILLIAM ALBERT RUDDELL. [L. S.]